(12) United States Patent
Wörz

(10) Patent No.: US 9,073,702 B2
(45) Date of Patent: Jul. 7, 2015

(54) FEEDING DEVICE

(71) Applicant: Multivac Sepp Haggenmüller GmbH & Co. KG, Wolfertschwenden (DE)

(72) Inventor: Norbert Wörz, Erkheim (DE)

(73) Assignee: MULTIVAC SEPP HAGGENMULLER GMBH & CO. KG, Wolfertschwenden (GB)

( * ) Notice: Subject to any disclaimer, the term of this patent is extended or adjusted under 35 U.S.C. 154(b) by 34 days.

(21) Appl. No.: 13/768,631

(22) Filed: Feb. 15, 2013

(65) Prior Publication Data
US 2013/0213767 A1 Aug. 22, 2013

(30) Foreign Application Priority Data

Feb. 22, 2012 (DE) .................. 10 2012 003 500

(51) Int. Cl.
*B65G 47/26* (2006.01)
*B65G 47/31* (2006.01)
*B65G 47/08* (2006.01)
*B65G 43/08* (2006.01)

(52) U.S. Cl.
CPC .............. *B65G 47/31* (2013.01); *B65G 47/082* (2013.01); *B65G 43/08* (2013.01)

(58) Field of Classification Search
CPC ........ B65G 47/31; B65G 47/30; B65G 43/08; B65G 43/10; B65G 47/261
USPC ............. 198/419.2, 460.1, 461.1, 461.2, 432, 198/433
See application file for complete search history.

(56) References Cited

U.S. PATENT DOCUMENTS

| | | | | |
|---|---|---|---|---|
| 4,142,624 A | * | 3/1979 | Diver et al. ................. | 198/419.2 |
| 4,360,098 A | * | 11/1982 | Nordstrom ................. | 198/418.1 |
| 4,518,075 A | | 5/1985 | Aykut et al. | |
| 5,038,915 A | * | 8/1991 | Delsanto ..................... | 198/419.3 |
| 5,070,995 A | * | 12/1991 | Schaffer et al. ............. | 198/460.1 |
| 5,092,450 A | * | 3/1992 | Schommartz et al. ..... | 198/460.1 |
| 5,097,939 A | * | 3/1992 | Shanklin et al. ........... | 198/419.2 |
| 5,123,231 A | | 6/1992 | Fallas et al. | |
| 5,547,004 A | * | 8/1996 | Fransen ...................... | 198/419.3 |
| 7,793,772 B2 | * | 9/2010 | Schafer ....................... | 198/460.1 |
| 8,011,495 B2 | | 9/2011 | Anderson et al. | |
| 2009/0250312 A1 | * | 10/2009 | Meisinger .................. | 198/419.2 |

FOREIGN PATENT DOCUMENTS

| | | |
|---|---|---|
| DE | 4002724 A1 | 8/1991 |
| EP | 0385245 A2 | 9/1990 |
| GB | 2341374 A | 3/2000 |

* cited by examiner

*Primary Examiner* — James R Bidwell
(74) *Attorney, Agent, or Firm* — Husch Blackwell LLP

(57) ABSTRACT

The invention relates to a feeding device for transporting products, wherein the products are provided to the feeding device in groups. The feeding device comprises at least one first and one second conveyor belts which are arranged one behind the other in the direction of transport, wherein a first group of products can be transferred from the first conveyor belt to the second conveyor belt. According to the invention, the conveyor belts can be accelerated such that a gap between the groups can be reduced to improve the production flow.

13 Claims, 3 Drawing Sheets

FEEDING DEVICE

CROSS-REFERENCE TO RELATED APPLICATIONS

This Application claims priority to German Application Number 102012003500.4 filed Feb. 22, 2012, to Norbert Wörz entitled "Feeding Device," currently pending, the entire disclosure of which is incorporated herein by reference.

FIELD OF THE INVENTION

The present invention relates to a feeding device and method of operating same.

BACKGROUND OF THE INVENTION

In practice, particularly in the food industry, feeding devices are employed in picker lines. The feeding device comprises a conveyor belt which is functionally disposed between a cutting device and a picker. From the cutting device, a cut product can be transferred to the conveyor belt of the feeding device which transports the product to the picker. The latter picks up the product and transfers it to a downstream packaging machine.

The cutting device can cut, for example, cheese, sausage or meat. The slices produced from a loaf of cheese, a caliber of sausage or a portion of meat are transferred to the conveyor belt of the feeding device as a group of, for example, ten slices. The slices of the group are transported one after the other away from the cutting device by the feeding device at short distances.

The problem is that, following one group of products, for a certain time no more products are transferred to the feeding device because first a new caliber of cheese, sausage, meat or the like must be inserted into the cutting device for cutting.

As a consequence, the picker can only accept the products from the feeding device at intervals, while it is standing still between the intervals and must wait for a following group. The standstill periods of the picker and a downstream deep-drawing packaging machine resulting from it increase manufacturing costs.

SUMMARY OF THE INVENTION

Consequently, it is the object of the invention to provide a feeding device which can improve a production flow using simple, constructive technical features. Moreover, one is looking for a method by which the above problems can be eliminated.

The invention relates to a feeding device for transporting products, these products being provided to the feeding device in groups. The feeding device comprises at least one first and one second conveyor belts which are disposed one behind the other in a direction of transport, wherein a first group of products can be transferred from the first conveyor belt to the second conveyor belt.

Moreover, a control unit is provided which is functionally connected with the first and the second conveyor belts, the control unit being configured such that it can accelerate the first conveyor belt independently of the second conveyor belt and synchronize their acceleration and/or speeds.

According to the invention, the first conveyor belt can be accelerated by the control unit when the first group of products has been transferred to the second conveyor belt and a further, second group of products has arrived on the first conveyor belt to reduce a gap between the first and the second groups of products, so that products made available to the feeding device one after another in different groups can be discharged essentially at equal distances.

The grouped products are, for example, slices of cut cheese, cut sausage or cut meat. The slices are disposed in the group one after the other in one or several adjacent rows. For example, it can be fourteen slices of cheese, where seven slices lying one behind the other each are arranged in two adjacent rows and can be transported from the feeding device as a group.

Equally, the grouped products of the feeding device can be provided to the feeding device in receiving dishes. This would be the case, for example, if the products were each be placed into the receiving dishes by a preceding production step.

By reducing the gap between groups transported one after the other, it is possible to discharge the products from the feeding device essentially at equal distances with respect to each other and/or at a mutual minimum distance that is advantageous for the operation of a downstream device, for example a picker. By this, one can prevent the product flow from standing still temporarily, thus ensuring that the picker is continuously moving products, so that a subsequent deep-drawing packaging machine and further subsequent processing stations, such as a labeling machine or scales, can work continuously.

Preferably, the first conveyor belt can be functionally coupled to a conveyor belt of a preceding machine, for example a cutting device or a so-called slicer, respectively. By this, the product groups can be easily provided at the inlet of the first conveyor belt.

It is also advantageous if the control unit can synchronize the speed of the first conveyor belt with a speed of the conveyor belt of the preceding machine such that the products of a respective group can be transferred to the first conveyor belt at equal distances with respect to each other. By this, the products can be fed to a downstream device at reduced efforts for open-loop and closed-loop control.

According to a further embodiment, the feeding device comprises a third conveyor belt which is disposed, seen in the direction of transport, behind the second conveyor belt to accept products from the second conveyor belt. Thereby, the feeding device can be employed even more flexibly, where the gap between subsequent groups can be even better reduced. Optionally, further improvement can be achieved with further conveyor belts.

Moreover, it can be provided that the first and the second conveyor belts can be synchronously accelerated together by the control unit when, seen in the direction of transport, the last product of a respective group has been transferred to the third conveyor belt and a further, subsequent group of products has arrived on at least the first conveyor belt. The effect of this is that a relatively large group of products, some of which are positioned, for example, on the first and some of which are positioned on the second conveyor belt, can be accelerated to reduce the gap to the preceding group.

In one embodiment, the first conveyor belt is essentially as long as the second and the third conveyor belts together. It would also be advantageous for the first conveyor belt to be long enough to be suited for receiving a complete group of products. By this, the second conveyor belt can be more often moved independently of the first conveyor belt.

A further embodiment provides for the second conveyor belt to be longer than the third conveyor belt. This can be particularly advantageous if it should be possible to highly accelerate the second conveyor belt.

It is also possible for the first conveyor belt to be each longer than the second or the third conveyor belt. This makes the first conveyor belt particularly suited for receiving the respective groups of products at the inlet of the feeding device.

For a particularly flexible application, a length of the first, second and/or third conveyor belt can be variable. This causes the feeding device to be suitable for the inventive transport of product groups of different sizes. The length of the respective conveyor belts is defined as the respective belt section which defines a conveyor distance of the respective conveyor belt.

For a positionally accurate transfer of the transported products to a subsequent machine, for example a packaging machine, the feeding device can comprise a picker which is designed to accept the products from a picker belt following the second or third conveyor belt. Subsequently, it can transfer the products to the packaging machine.

The first conveyor belt can be intermittently moved by the control unit. Here, an intermittent movement of the first conveyor belt can be performed independently of a movement of the other conveyor belts by the control unit. This permits to synchronize a movement of the first conveyor belt with a clocked movement of the conveyor belt of the preceding device. This can in particular be advantageous if the cut slices should each fall into receiving dishes which are provided by the conveyor belt of the cutting device for receiving products.

The invention also relates to a method of operating a feeding device according to one of the preceding embodiments, wherein a first group of products is received on a first conveyor belt, and the first group of products is transferred to a subsequent second conveyor belt by means of the first conveyor belt. Here, it is provided to accelerate the first conveyor belt when the first group of products has been transferred to the second conveyor belt, and a further, following second group of products has been received on the first conveyor belt to reduce a gap between the first and the following, second group of products, so that the products of both groups can be discharged essentially at equal distances.

This results in the production flow taking place without any essential interruptions because the feeding device can regularly supply subsequent devices, such as a picker, with products.

Additionally, the second conveyor belt might transfer the group of products to a third conveyor belt of the feeding device which is disposed behind the second conveyor belt in the direction of transport. By this, the method can be employed even more flexibly. Finally, this helps to even better utilize a buffer function of the feeding device.

Preferably, the first and the second conveyor belts are accelerated together synchronously when the last product of a respective group, seen in the direction of transport, has been transferred to the third conveyor belt, and a further subsequent group of products has arrived at least on the first conveyor belt. Thereby, a group of products following a preceding group can quickly close up to the latter.

It is also advantageous to synchronously accelerate the first, second and third conveyor belts together when the last product of a respective group, seen in the direction of transport, has been discharged from the third conveyor belt and a further, following group of products has arrived at least on the first conveyor belt.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are designated by identical reference numerals throughout the figures.

DETAILED DESCRIPTION OF. THE INVENTION

Figure 1:
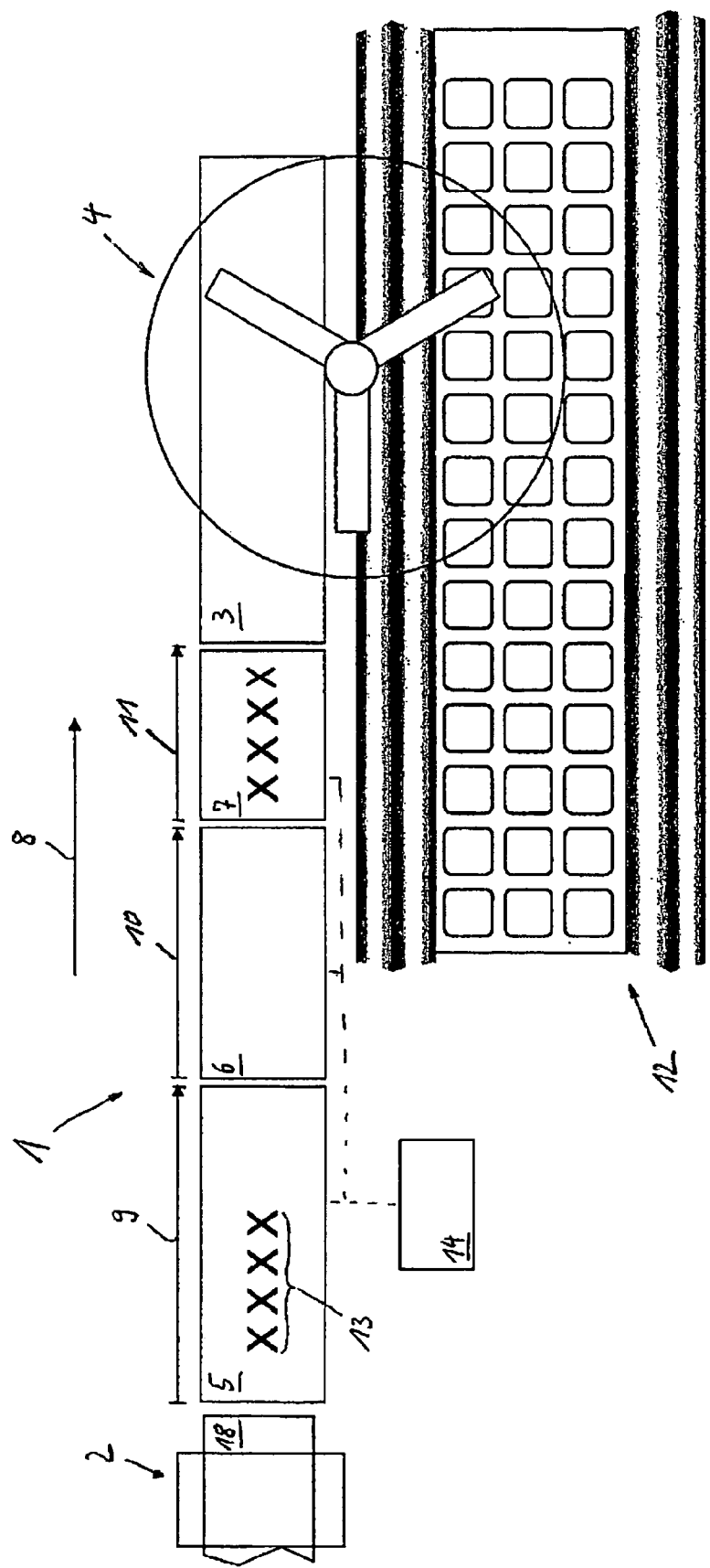
FIG. 1 is a schematic view of the feeding device between a preceding machine and a picker device in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a feeding device 1 which is functionally disposed between a preceding machine 2 (e.g., a cutting machine for sausage or cheese) and a picker belt 3 of a picker 4. The feeding device 1 comprises a first, second and third conveyor belts 5, 6, 7 which are disposed one behind the other in a direction of transport 8.

The first conveyor belt 5 has a length defined by a first conveyor distance 9. The second conveyor belt 6 has a length which is defined by a second conveyor distance 10. The third conveyor belt 7 has a length which is defined by a third conveyor distance 11.

Moreover, FIG. 1 shows a group 13 of products X lying on the first conveyor belt 5. The group 13 comprises four products X. A further group of four products X is lying on the third conveyor belt 7.

In FIG. 1, the picker 4 is functionally disposed upstream of a packaging machine 12. The picker 4 can pick up the products from the picker belt 3, or as an alternative from the third conveyor belt 7, and transfer them to the packaging machine 12.

Figure 2:
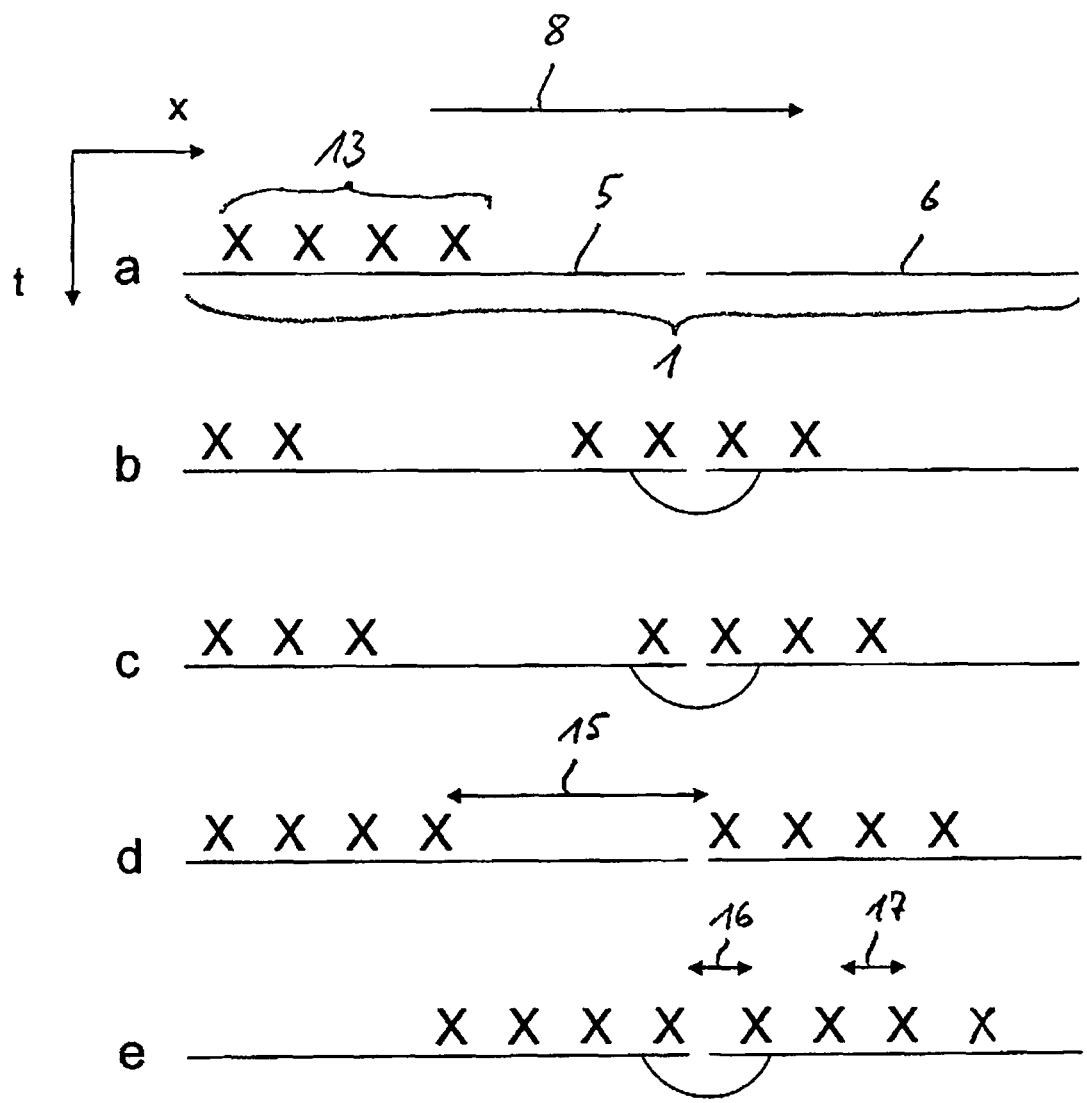
FIG. 2 is a chart showing an example of product flow performed by feeding device in accordance with one embodiment of the present invention.

FIG. 2 shows a flow chart which can be performed by means of the feeding device 1. Here, snapshots a) to e) are shown in a vertical direction at different points in time t. According to the example illustrated hereby, the group 13 as in FIG. 1 comprises four products X.

In contrast to FIG. 1, the schematically shown feeding device 1 only comprises the first and the second conveyor belts 5, 6 in the respective snapshots a) to e).

In a), the group 13 is completely positioned on the first conveyor belt 5. The first conveyor belt 5 moves such that the group 13 is moved in the direction of transport 8 to the second conveyor belt 6. For the products X to remain at equal distances with respect to each other when they are transferred from the first conveyor belt 5 to the second conveyor belt 6, the second conveyor belt 6 can run at the same speed as the first conveyor belt 5. This is shown by the snapshot b).

In b), the first and the second conveyor belts 5, 6 move at the same speeds, so that the products X can be transferred from the first conveyor belt 5 to the second conveyor belt 6 essentially at equal distances with respect to each other. In b), two products X have already been transferred to the second conveyor belt 6, while two products X are still located on the first conveyor belt 5. Finally, two further products X of a subsequent group 13 have already reached the inlet of the first conveyor belt in b).

In c), the first group 13 has been nearly completely transferred to the second conveyor belt 6. Only one product X is still left on the first conveyor belt 5. As long as the latter is still lying on the first conveyor belt 5, the first and the second conveyor belts 5, 6 move at the same speeds. Moreover, already three products X of the subsequent group 13 have arrived on the first conveyor belt 5.

In d), one complete group 13 of products X each is located on the first and the second conveyor belts 5, 6. In this snapshot, there is a gap 15 between the first product X of the group 13 located on the first conveyor belt 5 and the last product X of the group 13 located on the second conveyor belt 6, seen in the direction of transport 8, which gap 15 must be reduced in order not to interrupt the production flow. Therefore, in d), the first and the second conveyor belts 5, 6 can be accelerated independently of each other. In particular, in this snapshot, the first conveyor belt 5 can be accelerated such that the complete group 13 present on the first conveyor belt 5 closes up to the preceding group 13 which is already present on the second conveyor belt 6.

In e), a snapshot is shown in which by acceleration of the first conveyor belt 5, the group 13 present on it has closed up to the preceding group 13 on the second conveyor belt 6. The gap 15 has been reduced thereby such that between the first product X of the group 13 located on the first conveyor belt 5 and the last product X of the group 13 located on the second conveyor belt 6, there is only a distance 16. The distance 16 essentially corresponds to a distance 17 as it exists between the products X of a respective group 13. The eight products X moved together in e) can then be evenly discharged one after another by the feeding device 1. For this, the first and second conveyor belts 5, 6 are moved again at the same speeds. As soon as the last product X of the moved-together group 13 has been transferred to the second conveyor belt 6 and a subsequent group 13 is present on the first conveyor belt 5, the first conveyor belt 5 can be accelerated again to reduce the gap 15 again.

The snapshots a) to e) have been used only by way of example to illustrate the inventive principle of the feeding device. Here, the snapshots a) to e) do not represent a complete procedure.

Figure 3:
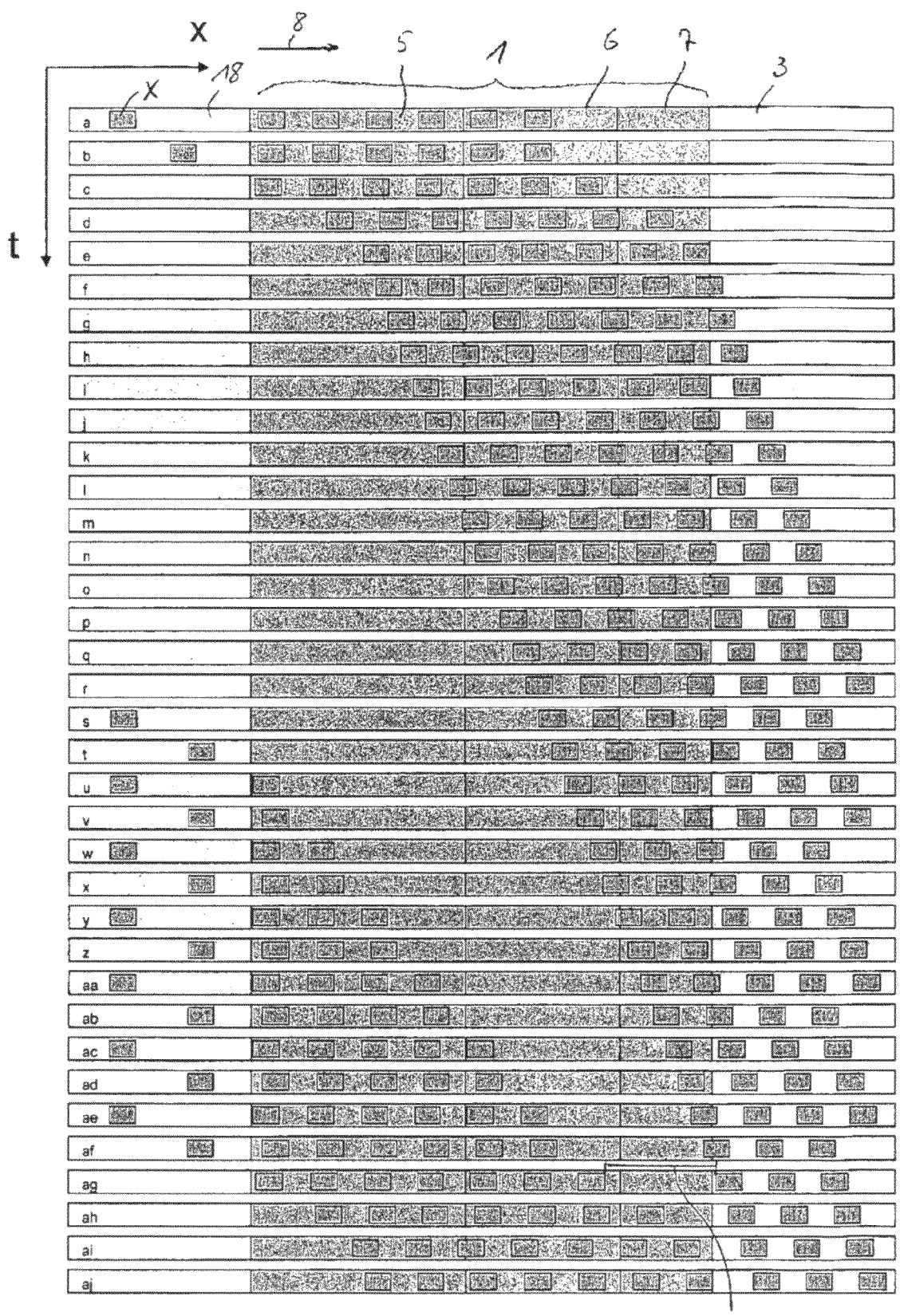
FIG. 3 is a chart showing an example of product flow performed by feeding device in accordance with another embodiment of the present invention.

FIG. 3 is a further flow chart of the inventive feeding device 1 according to a second embodiment.

The feeding device 1 used for the flow chart of FIG. 3 comprises the first, second and third conveyor belts 5, 6, 7 which are disposed one behind the other in the direction of transport 8. In FIG. 3, snapshots a) to aj) are shown along a vertical time axis t which will be summarized below.

According to FIG. 3, one group 13 comprises seven products X. Within the group 13, the products X are arranged essentially at the same distances with respect to each other. The products X are provided to the feeding device 1 one after the other by a conveyor belt 18 of the preceding machine 2. Behind the third conveyor belt 7, the picker belt 3 is provided from which the picker 4 (not shown here) picks up the provided products X.

In a) to c), the group 13 is supplied to the conveyor belts 5, 6. Here, the first conveyor belt 5 is synchronized with the second one 6, so that they move at the same speeds. The movement of the conveyor belts 5, 6 is synchronized with the conveyor belt 18 of the preceding machine 2 during the transfer of each product X onto the first conveyor belt 5. Consequently, it is ensured that the product X is not damaged during transfer. In c), the group 13 has been completely transferred to the feeding device 1, where four of the products X are lying on the first and three of the products X are lying on the second conveyor belts 5, 6.

From c) through to the arrival of the foremost product X at the picker belt 3 in e), the group of conveyor belts 5, 6, 7 can be moved at any speed, preferably at a speed that is as high as possible.

From e) on, the speed of the conveyor belts 5, 6, 7 is synchronized with the speed of the picker belt 3 to supply the group 13 to the picker belt 3. In any case, the speed of the conveyor belts 5, 6, 7 remains the same down to snapshot n).

In n), no more product X is located any more on the first conveyor belt 5. It is therefore possible to decouple it from the movement of the subsequent conveyor belts 6, 7. The second and the third conveyor belts 6, 7 still move at the same speeds.

The picker 4 can pick up products X from the picker belt 3 already from h) on. From s) on, the picker 4 actually begins to pick up the provided products X from the picker belt 3 to transfer them to a subsequent production step in the shown example. Simultaneously, one starts with supplying a further, subsequent group 13 of the feeding device 1 at the inlet at the first conveyor belt 5. This could already start as of step n). Until z), the second and the third conveyor belts 6, 7 run at the same speeds because products X are located on the second as well as on the third conveyor belts 6, 7.

In z), only two products X remain on the third conveyor belt 7. From this time on, it is possible to move the second conveyor belt 6 at a speed different from that of the third conveyor belt 7. During the snapshots z), aa) and ab), the empty second conveyor belt 6 can be put into a rest mode where it stands still, for example. At the latest from snapshot ab) on, the second conveyor belt 6 moves at the same speed as the first conveyor belt 5. This permits that, during the transfer of the products X, the latter are shifted from the first conveyor belt 5 to the second conveyor belt 6 at equal distances. The common speed of the first and the second conveyor belts 5, 6 can be adjusted such that the following products X arrive from the conveyor belt 18 of the preceding machine 2 each at equal distances to the previous product X on the first conveyor belt 5.

In ag), the following group 13 is complete, where four of the products X are lying on the first conveyor belt 5 and three of the products X are lying on the second conveyor belt 6. At this point in time, already four products X of the preceding group 13 have been picked up by the picker 4, where the last product X of the preceding group 13, seen in the direction of transport 8, has been already transferred from the third conveyor belt 7 to the picker belt 3.

By collecting the subsequent group 13 on the first and the second conveyor belts 5, 6 and discharging the preceding group 13, the gap 15 also forms in the flow chart of FIG. 3. This gap 15 which is formed between the first product X of the group 13 located on the first and the second conveyor belts 5, 6, and the last product X of the preceding group 13 remaining on the picker belt 3 must be reduced to improve the production flow.

For this, in ah), the first, second and third conveyor belts 5, 6, 7 are accelerated together to finally continue at the same speed as the picker belt 3 from ai) on. The gap 15 could thus be reduced to a distance 16 which essentially corresponds to the equidistant distance 17 between the products X within one group 13.

The feeding device 1 according to the invention can be employed in any fields of industry, so it is not restricted to the above-described use in food industry. All products, no matter of what type, which are provided to the feeding device 1 in successive, spaced apart groups can be buffered by the feeding device 1 such that the products can be discharged from the feeding device 1 at regular distances.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. Feeding device for transporting products which are provided to the feeding device in groups, said feeding device comprising:
   first and second conveyor belts which are arranged in the direction of transport one behind the other, wherein a first group of products can be transferred from the first conveyor belt to the second conveyor belt; and
   a control unit which is functionally connected with the first and second conveyor belts, wherein the control unit is operable to accelerate the first conveyor belt independently of the second conveyor belt and can synchronize an acceleration and/or speed of the first conveyor belt with an acceleration and/or speed of second conveyor belt;
   wherein the control unit accelerates said first conveyor belt when the first group of products has been transferred to the second conveyor belt and a second group of products is disposed on the first conveyor belt to reduce a gap distance between the first and second groups of products;
   wherein the feeding device comprises a third conveyor belt disposed behind the second conveyor belt in the direction of transport, the third conveyor belt being configured to receive the products from the second conveyor belt; and
   wherein the first, second, and third conveyor belts may be moved synchronously and independently.

2. Feeding device according to claim 1, wherein the first conveyor belt can be functionally coupled to a conveyor belt of a preceding machine.

3. Feeding device according to claim 2, wherein the control unit can synchronize the speed of the first conveyor belt with a speed of the conveyor belt of the preceding machine.

4. Feeding device according to claim 1, wherein the first and second conveyor belts can be synchronously accelerated together by the control unit when the last product of a respective group, seen in the direction of transport, has been transferred to the third conveyor belt and a further, subsequent group of products has arrived at least on the first conveyor belt.

5. Feeding device according to claim 1, wherein the first conveyor belt is essentially as long as the second and third conveyor belts together.

6. Feeding device according to claim 1, wherein the second conveyor belt is longer than the third conveyor belt.

7. Feeding device according to claim 1, wherein the first conveyor belt is longer than each of the second or third conveyor belt.

8. Feeding device according to claim 1, characterized in that a length of the first, second and/or third conveyor belt is variable.

9. Feeding device according to claim 1, wherein the feeding device comprises a picker which is designed to discharge the products onto a picker belt.

10. Feeding device according to claim 1, wherein the first conveyor belt can be intermittently moved by the control unit.

11. Method of operating a feeding device comprising the following steps:
    providing a feeding device including first and second conveyor belts which are arranged in a direction of transport one behind the other, wherein a first group of products can be transferred from the first conveyor belt to the second conveyor belt;
    receiving the first group of products on a first conveyor belt;
    transferring the first group of products from the first conveyor belt to the second conveyor belt;
    receiving a second group of products on the first conveyor belt; and
    accelerating the first conveyor belt after the first group of products has been transferred to the second conveyor belt and the second group of products has been received on the first conveyor belt;
    reducing a gap distance between the first and second groups of products by said accelerating step;
    transferring the first group of products from the second conveyor belt to a third conveyor belt of the feeding device which is disposed behind the second conveyor belt in the direction of transport; and
    synchronously accelerating the first and second conveyor belts-when the last product of a respective group, seen in the direction of transport, has been transferred to the third conveyor belt, and a further, subsequent group of products has arrived at least on the first conveyor belt.

12. Method according to claim 11, further comprising synchronously accelerating the first, the second and third conveyor belts when the last product of a respective group, seen in the direction of transport, has been discharged by the third conveyor belt, and a further, subsequent group of products has arrived at least on the first conveyor belt.

13. Feeding device for transporting products which are provided to the feeding device in groups, said feeding device comprising:
- first and second conveyor belts which are arranged in the direction of transport one behind the other, wherein a first group of products can be transferred from the first conveyor belt to the second conveyor belt;
- a third conveyor belt disposed behind the second conveyor belt in the direction of transport, the third conveyor belt being configured to receive the products from the second conveyor belt, wherein a length of the first, second and/or third conveyor belt is variable; and
- a control unit which is functionally connected with the first and second conveyor belts, wherein the control unit is configured such that it can accelerate the first conveyor belt independently of the second conveyor belt and can synchronize an acceleration and/or speed of the first conveyor belt with an acceleration and/or speed of second conveyor belt;
- wherein the first conveyor belt can be accelerated by the control unit when the first group of products has been transferred to the second conveyor belt, and a further, second group of products has arrived on the first conveyor belt to reduce a gap distance between the first and second groups of products.

* * * * *